US008694762B2

(12) United States Patent
Ekberg

(10) Patent No.: US 8,694,762 B2
(45) Date of Patent: Apr. 8, 2014

(54) SECURE BOOT WITH TRUSTED COMPUTING GROUP PLATFORM REGISTERS

(75) Inventor: Jan-Erik Ekberg, Vantaa (FI)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 13/474,989

(22) Filed: May 18, 2012

(65) Prior Publication Data

US 2012/0297175 A1    Nov. 22, 2012

Related U.S. Application Data

(60) Provisional application No. 61/519,278, filed on May 18, 2011.

(51) Int. Cl.
*G06F 7/02* (2006.01)
*G06F 15/16* (2006.01)

(52) U.S. Cl.
USPC .................................... 713/1; 713/2; 713/100

(58) Field of Classification Search
None
See application file for complete search history.

(56) References Cited

U.S. PATENT DOCUMENTS

| | | | |
|---|---|---|---|
| 2008/0059799 A1* | 3/2008 | Scarlata | 713/176 |
| 2008/0114989 A1 | 5/2008 | Anbalagan et al. | |
| 2008/0282348 A1 | 11/2008 | Proudler et al. | |
| 2009/0013406 A1 | 1/2009 | Cabuk et al. | |
| 2009/0249050 A1* | 10/2009 | Datta et al. | 713/1 |
| 2010/0325628 A1 | 12/2010 | Haga et al. | |
| 2011/0191574 A1* | 8/2011 | Iliev et al. | 713/2 |

FOREIGN PATENT DOCUMENTS

| | | |
|---|---|---|
| WO | 2010041467 A2 | 4/2010 |
| WO | 2010095432 A1 | 8/2010 |
| WO | 2011146305 A2 | 11/2011 |

OTHER PUBLICATIONS

Old, New, Borrowed, Blue—A Perspective on the Evolution of Mobile Platform Security Architectures. Kostiainen et al. ACM (2011).*
"Mobile Phone Work Group Use Case Scenarios—v 2.7", Trusted Computing Group™, 2005, 31 pgs.
"Mobile Trusted Module (MTM)—an introduction", Jan-Erik Ekberg, et al., NRC-TR-2007-015, 2007, 13 pgs.
"TCG Mobile Trusted Module Specification", Specification Version 1.0, Revision 7.02, Apr. 29, 2010, 103 pgs.

* cited by examiner

*Primary Examiner* — Venkat Perungavoor
(74) *Attorney, Agent, or Firm* — Harrington & Smith

(57) ABSTRACT

Disclosed is a method that includes providing at least two platform configuration registers, where a first platform configuration register is a measurement platform configuration register and where a second platform configuration register is a resettable binding configuration platform configuration register. The method further includes during an authorization of a device, such as a mobile device, including a value of the measurement platform configuration register as a precondition and extending the binding platform configuration register with a value enforced by the authorization. The method further includes monitoring a validation result of the binding platform configuration register. If the validation result indicates success then the measurement platform configuration register can be extended with a reference value, while if the validation result instead indicates a failure then the measurement platform configuration register can be extended with a predetermined error value. Apparatus and computer program instructions that implement the method are also disclosed.

23 Claims, 3 Drawing Sheets

SECURE BOOT WITH TRUSTED COMPUTING GROUP PLATFORM REGISTERS

CLAIM OF PRIORITY FROM COPENDING PROVISIONAL PATENT APPLICATION

This patent application claims priority under 35 U.S.C. §119(e) from Provisional Patent Application No. 61/519,278, filed May 18, 2011, the disclosure of which is incorporated by reference herein in its entirety, including all Exhibits attached thereto.

TECHNICAL FIELD

The exemplary and non-limiting embodiments of this invention relate generally to data processing systems, methods, devices and computer programs and, more specifically, relate to secure boot procedures, trusted computing group (TCG) technology and trusted platform modules.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

MRTM mobile remote-owner trusted module
MTM mobile trusted module
PCR platform configuration register
RIM reference integrity metric
RoV root of trust for verification
RTM root of trust for measurement
RTS root of trust for storage
RTV root of trust for verification
RVAI root verification authority information
TCG trusted computing group
TPM trusted platform module An introduction to MTM can be found in "Mobile Trusted Environment (MTM)-an introduction", Jan-Erik Ekberg, Markku Kylänpää, Nokia Research Center NRC-TR-2007-015, © 2007 Nokia.

FIG. 1 herein reproduces FIG. 2 of TCG Mobile Trusted Module Specification, Specification Version 1.0, Rev. 7.02, 29 Apr. 2010. FIG. 1 shows a simple example of how a MRTM could be used. The MRTM would itself consist of a subset of the TPM v1.2 plus a set of new Mobile-specific commands designed to support requirements set by Trusted Computing Group, Mobile Phone Work Group Use Case Scenarios, Specification Version2.7, 2005. Additionally a Root-of-Trust-for-Verification (RTV) and Root-of-Trust-for-Measurement (RTM) module would be the first executable running in the runtime environment. The RTV+RTM module would first record a diagnostic measurement of its implementation. After the diagnostic extend the RTV+RTM module would measure and verify a measurement and verification agent executable using the MRTM before passing control to it. This measurement and verification agent then again measures and verifies the OS image before passing control to the OS. This structure allows an implementation of secure boot.

In the above-referenced Version 1 of the mobile specification TCG Mobile Trusted Module Specification, Specification a MTM has dedicated command and function sets to support the secure booting of a mobile device. In the context of revising this specification towards Version 2 the PC (baseline) specification has been augmented with features to access control updates to so-called platform control registers (PCRs) in an attempt to support secure booting directly in the baseline specification.

SUMMARY

In a first exemplary and non-limiting embodiment thereof this invention provides a method that comprises providing at least two platform configuration registers, where a first platform configuration register is a measurement platform configuration register and where a second platform configuration register is a resettable binding configuration platform configuration register; executing an authorization chain under direction of a trusted engine to perform an authorization, where a value of the measurement platform configuration register is included as a precondition; extending the binding platform configuration register with a value enforced by the authorization; and monitoring a validation result of the binding platform configuration register.

In a further exemplary and non-limiting embodiment thereof this invention provides an apparatus that comprises at least one processor and at least one memory that includes computer program code. The at least one memory and computer program code are configured, with the at least one processor, to cause the apparatus to provide at least two platform configuration registers, where a first platform configuration register is a measurement platform configuration register and where a second platform configuration register is a resettable binding configuration platform configuration register; to execute an authorization chain under direction of a trusted engine to perform an authorization, where a value of the measurement platform configuration register is included as a precondition; to extend the binding platform configuration register with a value enforced by the authorization; and to monitor a validation result of the binding platform configuration register.

In yet another exemplary and non-limiting embodiment thereof this invention provides an apparatus that comprises means for providing at least two platform configuration registers, where a first platform configuration register is a measurement platform configuration register and where a second platform configuration register is a resettable binding configuration platform configuration register; means for executing an authorization chain under direction of a trusted engine to perform an authorization, where a value of the measurement platform configuration register is included as a precondition; means for extending the binding platform configuration register with a value enforced by the authorization; means for monitoring with a trusted operating system a validation result of the binding platform configuration register; and means, responsive to a condition where a validation result of the binding platform configuration register indicates success, for extending the measurement platform configuration register with a reference value otherwise extending the measurement platform configuration register with a predetermined error value.

BRIEF DESCRIPTION OF THE DRAWINGS

In the attached Drawing Figures,
FIG. 1 reproduces FIG. 2 of TCG Mobile Trusted Module Specification, Specification Version 1.0, Rev. 7.02 and shows a simple example of how a MRTM could be used.

DETAILED DESCRIPTION

Figure 1:
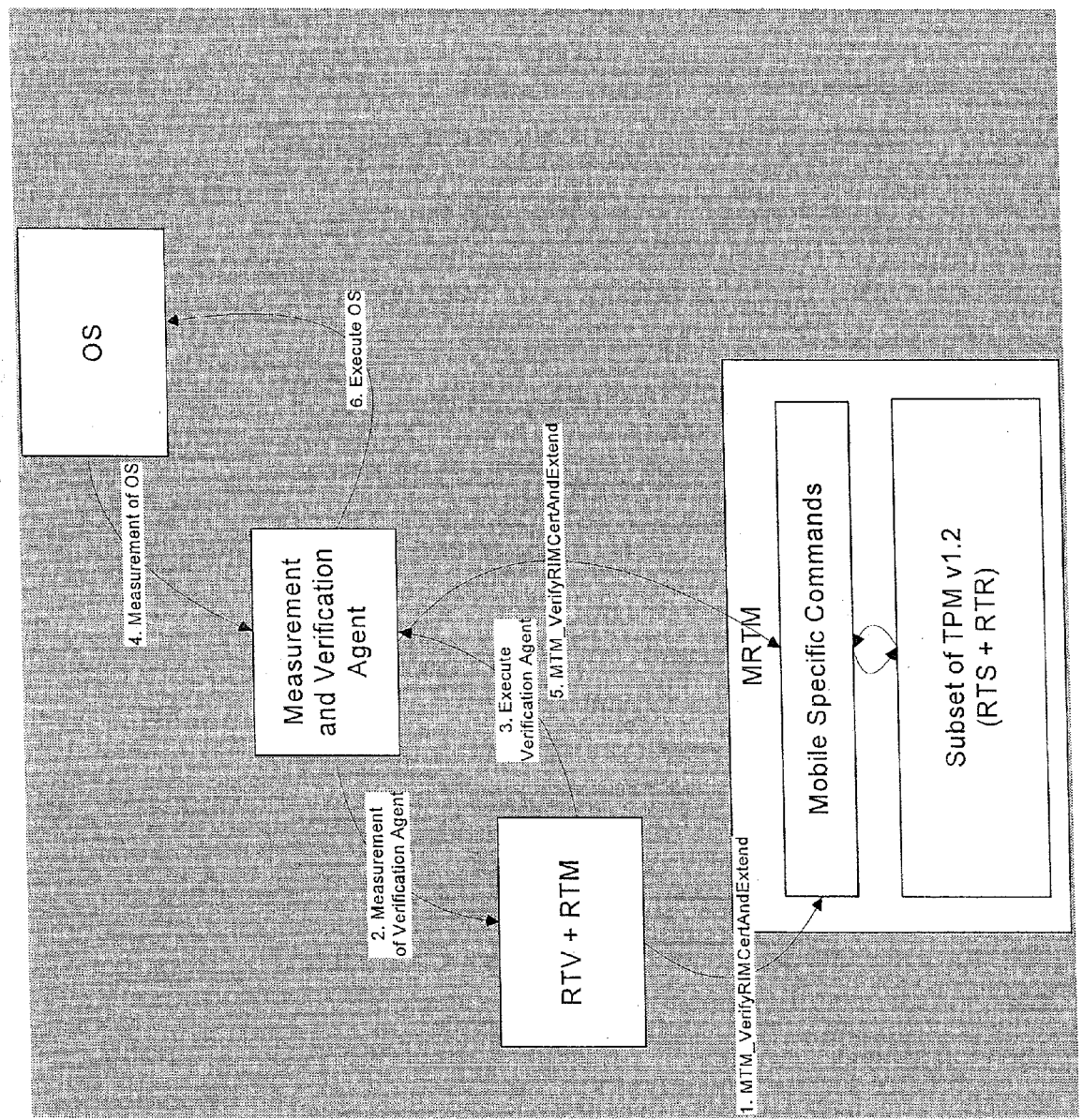

At a high level the provisions given by TPM2 are not by themselves sufficient to build a system (e.g., for MTM2) by which a reference register is conditionally extended if the following preconditions are fulfilled:
a trusted verification key has been loaded;
the register has a correct value to begin with;
a certificate for the register update exists;
the certificate is verifiably signed by the loaded trusted verification key;
the certificate contains the value to be extended into the register; and
the register value is conditionally extended if the certificate preconditions hold.

Instead, a system of two PCRs must be deployed in a specific fashion to achieve the same intent. The specific problem that is overcome is that the preconditions for a TPM2_PolicyAuthorize include the PCR value. If the boot chain changes the PCR value, and the TPM2_PolicyAuthorize does not fulfill the delegation, the origin of the authorization must produce a new authorization due to the changed PCR value, rather than the delegated entity making a new signature.

More technically: in order to circumvent the "tightness" of authorization binding, the command TPM2_PolicyAuthorize exists. This command allows a policyHash to be reset (and appended by a new value policyRef) assuming that the approvedPolicy matches the current policyHash. The operation is bound to an external signature by an asymmetric key (keySign), just as in PolicySigned. However, the use of PolicyAuthorize will diverge from the MTM1 use of RIM certificates, where the RIM certificate itself forces the measurement PCR to be locked down. By 'measurement' what is meant is that the state of the device is partly stored in that PCR.

The MTM secure boot support operated with dedicated commands in Version 1 of the specification. The need for the feature has been recognized, as has the fundamental set of preconditions for the validation of the integrity-protected token (a certificate) that need to be fulfilled for the system to operate.

The TPM2 specification has added commands towards this end, i.e., to support a secure boot. However, if the extended commands are trivially applied for secure boot (which they can be) targeting a given register, the system can lead to a setup where the certificate is not a delegated right (one that can be applied a posteriori to a securely booting operating system if a change occurs), but a rigid setup where all certifications must be done in advance and matched with the MTM state before a device can be put on the market. This is not consistent with the original concept of the secure boot architecture, where rights (of signing code for the secure boot path) are delegated as part of the device integration process.

The several uses of the various exemplary embodiments of this invention enable an a posteriori delegation of components for a secure boot path. This is accomplished by using two PCR registers, the measurement PCR corresponding to the PCR used in MTM Version 1, as well as a resettable PCR register (via some reset function) as a reference (binding) register for certification. The reset feature makes it possible to decouple the authorization from the PCR value (the binding registers' reference is always 0, since it is resettable). In addition, the authorization is carried out in the context of the binding register, although the measurement register's value is included as a precondition. Further, when the authorization chain is completed a trusted OS (operating system) component external to the MTMv2 monitors the validation result of the binding register, and if the validation succeeded, it extends the measurement register with the reference value, otherwise the measurement register is extended with a NULL value.

The system is enabled to bind precondition PCR values, reference update values and, for example, one or more counters in an integrity protected way so that there is no off-line attack possibility on the data used for the validation.

As of TPM2 (TPM Version 2), the necessary fundamental building blocks for constructing an authorized PCR update mechanism are available as a part of the baseline specification. Thus, the data structures for RIM Certificates, Verification Keys and associated concepts (verifiedPCRs) are not MTM-specific in the Version 2 of the TPM specification.

The following describes reference command sequences that implement the corresponding functions in the Version 2 of the specification.

The verifiedPCRs list is replaced by the commands TPM2 PCR SetAuthPolicy, which conditions PCRs or groups of PCRs to require an authorization, and TPM2_PCR_SetAuthValue for setting the reference value for the authorization session for a given PCR set. In MTM2, a minimal functional set may assume that these settings are implicit, and defined by code implementation or configuration.

With but few differences the RIM certificate is replaced by an extended authorization session. To achieve the necessary device bindings MTM1 used the RVAI as a trust root, e.g., a public key hash, stored in the state that served as the root for the public keys that verified the RIM certificates. The RVAI is by default bound to the authorization session, as the public key (hash) of the authorizing key is included in the policyHash of the authorizing session.

For example, one simple possible step is to have a (single) RIM certificate that allows an update to a single PCR with a given value assuming that the same PCR had a given previous value. While this is a basic example, note that a straightforward extension to several RIM updates is only indirectly possible:

The authValue of the PCR X is set to the policyHash accumulated by the following commands:
  PolicyPCR (bind to the earlier value of the PCR)
  PolicySigned (bind to an external signature). As the public key hash of the key accumulates into the policyHash, the specific key to be used is bound by the authValue, not by a specific RVAI
  PolicyCpHash (bind to command and parameter values). This authorization constrains the value to be updated into the PCR, i.e., the command parameters of the TPM2_Event are fixed.

With respect to traditional RIM certificates, there are several shortcomings with the foregoing simple example. For example, the next update of the PCR cannot immediately occur since the authValue of the PCR is fixed. This may be circumvented by using PolicyOr:s, where it is possible to make a policy that allows a sequence of updates to be bound to a PCR, assuming that the signing keys and PCR values are known at the time of MTM deployment. While in practice this scenario is unlikely to occur, this approach is pursued in the next non-limiting example that encompasses two PCR updates in sequence:

The authValue of the PCR X is set to the policyHash accumulated by the following commands:

PolicyOr (accept either of the two following sets):
Set 1:
PolicyPCR (bind to the original value of the PCR)
PolicySigned (bind to a external signature). As the public key hash of the key accumulates into the policyHash, the specific key to be used is bound by the authValue, not by a specific RVAI
PolicyCpHash (bind to command and parameter values). This authorization constrains the value to be extended into the PCR. We assume that the PCR after this extension will have the value Y
Set 2:
PolicyPCR (bind to value Y of the PCR)
PolicySigned (bind to a external signature)
PolicyCpHash (bind to command and parameter values)

It can be noted that the use of signatures is irrelevant in the two prior examples. While they provide authorization, the content of the authorizations (the PCR values) are fixed a priori. The intent of RIM certificates is to delegate the authority to set those values by means of verification keys and this intent is realized. Also, at most eight PolicyORs can be accepted in a TPM, translating to a sequence of a maximum of eight updates. While this may be satisfactory in some cases for a given PCR, in general this would not be an optimal realization.

To circumvent the strictness of the authorization binding the command TPM2_PolicyAuthorize is used. This command allows the policyHash to be reset (and appended by a new value policyRef) assuming that the approvedPolicy matches the current policyHash. The operation is bound to an external signature by an asymmetric key (keySign), just as in PolicySigned. However, the use of PolicyAuthorize diverges from the MTM1 use of RIM certificates, where the RIM certificate itself forces the measurement PCR to be locked down. By 'measurement' what is meant is that the state of the device is partly stored in that PCR.

In the context of most interest to the exemplary embodiments of this invention a reference and resettable binding PCR is locked down, but the measurement PCR (the PCR that will contain the state of the booted device) can be a traditional PCR (e.g., one that can be extended by anyone). Thus it is the responsibility of some "measure before execute" process during a secure boot procedure to insert a marker value into the measurement PCR should the signed authorization be evaluated by using the features of the binding PCR.

Figure 2:
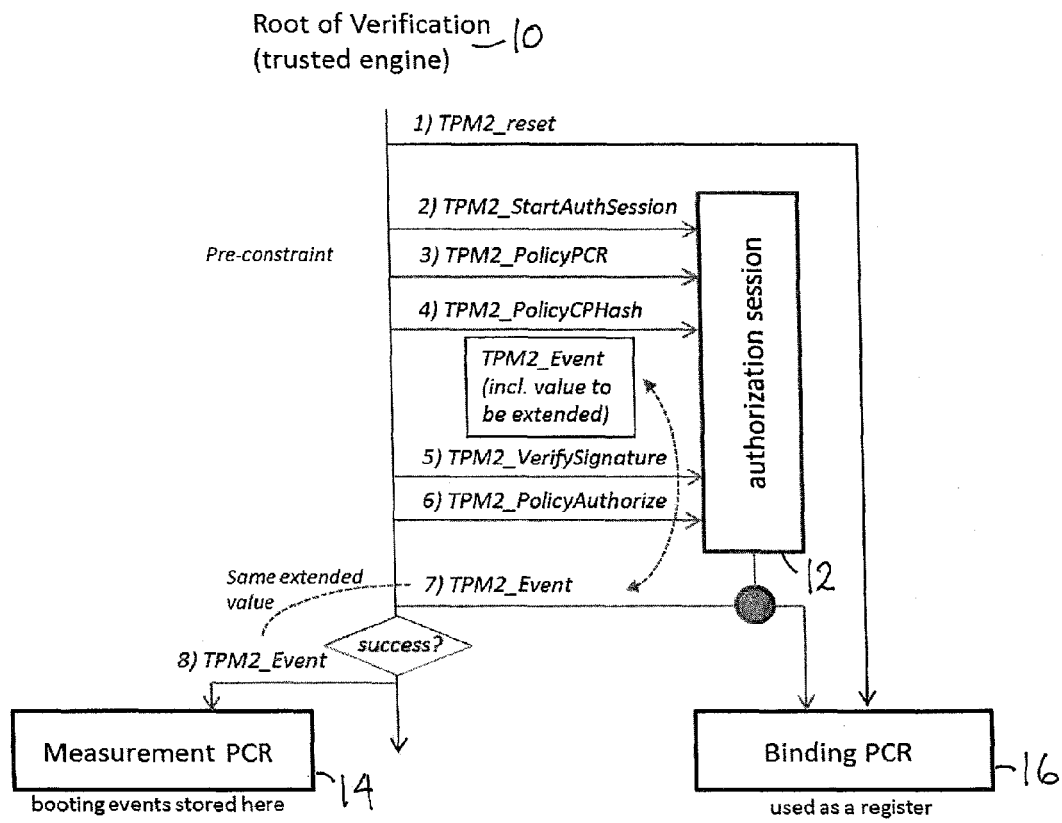
FIG. 2 illustrates reference integrity metrics.

Reference can be made to FIG. 2 for illustrating exemplary reference integrity metrics in accordance with a non-limiting embodiment of this invention. In FIG. 2 there is shown a Root of Verification (trusted engine) 10, an authorization session 12 and two PCRs, namely a Measurement PCR 14, where booting events are stored, and a Binding PCR 16, that is used as a register.

Although not particularly germane to this discussion, it can be noted that using PolicyAuthorize (see Step 6 in FIG. 2) is a two-step process where the signature on the "certificate" is validated first with TPM2_verifySignature( ) (see Step 5 in FIG. 2), a ticket is produced, and only then the PolicyAuthorize can be deployed using the ticket.

Due to the way the PolicyAuthorize operates the binding PCR 16 is also mapped in reverse order as compared to the way verification keys are loaded in MTM1.

The process proceeds as follows. Note that the sequential procedures depicted in FIG. 2 and described below can be viewed as a logic flow process descriptive of a method in accordance with the exemplary embodiments of this invention.

The root-of-trust for verification (RoV) 10, i.e., the piece or module of computer code outside the MTM that itself has already been verified and is part of the boot chain, performs the following steps in the operations shown in FIG. 2:

The RoV 10 measures a next piece of code or some data (M).
The authValue of the Binding PCR 16 contains the result of the application of PolicyAuthorize with the key (RVAI).
The RoV 10 resets the Binding PCR 16 (Step 1 in FIG. 2).
The authorization session 12, in response to Step 2 (TPM2_StartAuthSession), authorizes the update of the Binding PCR 16 (note, not the Measurement PCR 14).
The RoV 10 applies PolicyPCR in Step 3 for the Measurement PCR 14 (to bind to the original value of the PCR).
The RoV 10 applies PolicyCpHash in Step 4 (to bind to command and parameter values). One can note the disparity here, as the procedure binds the parameter value (notably the event/hash M that eventually will be put in the Measurement PCR 14), to ensure (by virtue of the "certificate" that is implicitly formed by PolicyAuthorize) that the M matches the intended reference. However, this binding technically is for an eventual update of the Binding PCR 16, not for the Measurement PCR 14 which is the eventual target.
The RoV 10 applies, after Step 5 the TPM2_VerifySignature, the PolicyAuthorize in Step 6. Due to the comparison against the current policyHash, this indirectly checks the values of the current value of the Measurement PCR 14, and the PolicyCpHash assures the value M to be updated.
The RoV 10 updates the Binding PCR 16 with the value M. As the signature key name will be part of the new policy hash, its' matching against the policyAuth in the Binding PCR 16 guarantees that the correct key has been used for the authorization. The M will be checked against the authorization and, thus, if the update (with TPM2_Event in Step 7) succeeds, the RoV 10 can be assured that both the current state of the device is correct (current value of the Measurement PCR 14), as is the update value.
Finally, the RoV 10 updates the Measurement PCR 14 with the value M. However, if the update of the Binding PCR 16 failed the RoV 10 updates the Measurement PCR 14 with a known error marker (e.g., NULL).

Note that this process, although more complicated than the application of the two relatively more simple commands of Load Verification key and subsequent VerifyRIMCert (as was the case in MTM1) achieves the same goals as in MTM1. More specifically, the correct integrity measurement at whatever stage of the boot process is separated from the code being booted, and can be applied separately and augmented independently of the code. In addition, the augmentation of the boot policy need not change the MTM2 configuration. Furthermore, the correct integrity measurement is by design integrity-protected in its own right. That is, the correct integrity measurement (actually the PolicyAuthorize ticket) can be stored in the device in any unprotected media without any risk of tampering.

Discussed now in order to achieve an even more comprehensive understanding of the embodiments of this invention is Counter binding.

A non-volatile (NV) memory in TPM2 supports counters, and these can be bound into the authorization by the command PolicyNV. This applies especially to the PCR auth-Value and the approvedPolicy of the PolicyAuthorize. A 'good' authorization setup would require that these values include a comparison against a counter value (larger than a nominal value (the operandB), the proof of which will be included in the authorization).

In order for the secure boot system to be applicable across a set of devices, the NV indexes to be used for counters (especially the equivalencies to the Bootstrap counter and the RIMCert counter in MTM v1) is predetermined. Thus the following NV indexes are considered reserved and predefined in MTM Version 2:

0x01 0x00 0x00 0x00: Boostrap counter. Initialized to a counter (TPMA_NV_COUNTER). However, the maximum number of required steps of this counter is 32, making it possible to implement the counter, for example, by e-fuses.

0x01 0x00 0x00 0x01: RimCert counter. Initialized to a counter (TPMA_NV_COUNTER). However, the maximum number of required steps of this counter is 4095.

The authorization for using these counters with TPM2_NV_Increment( ) is preferably made conditional to the application of a PolicyAuthorize (with some key in the hierarchy formed from the binding PCR), where the approvedHash at least includes a binding to the previous counter value of the same NV index the increment is applied for. In this manner every counter update requires a new authorization.

Figure 3:
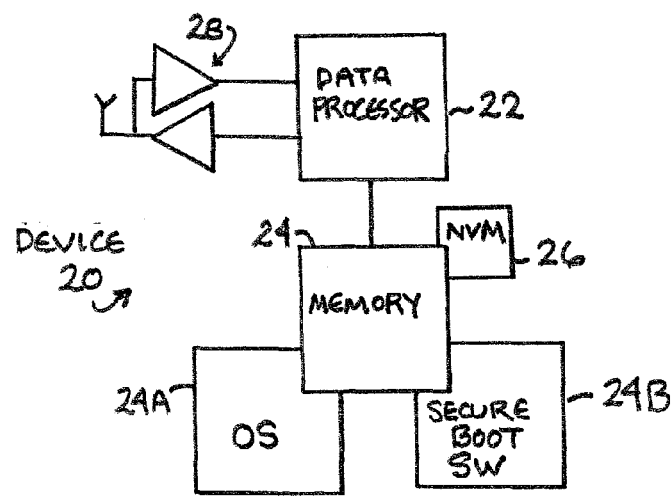
FIG. 3 is a block diagram of a device, such as a mobile device, that can be used to implement the exemplary embodiments of this invention.

FIG. 3 is a block diagram of a device 20 that can be used to implement the exemplary embodiments of this invention. The device 20 includes at least one data processor 22 connected with at least one memory device 24 (e.g., one or more of dynamic RAM, static RAM, disk, FLASH) that stores program instructions including an operating system (OS) 24A and secure boot software (SW) 24B that operates in accordance with the exemplary embodiments as described above and shown below in FIG. 4. The memory 24 can also include a non-volatile memory (NVM) device or portion 26. At least some of the above-referenced counters may be stored in the NVM 26. The Measurement PCR 14 and the Binding PCR 16 can be embodied as, for example, physical registers in the data processor 22 or elsewhere, or they can be embodied as locations in the memory 24 or the NVM 26.

The device 20 can be a wireless device, such as a 'smartphone', a PC, or a tablet, a laptop, or any type of computing device that can benefit from the use of the secure boot procedures described herein. In some embodiments the device 20 can be a mobile device and can include at least one wireless transceiver 28 for conducting bi-directional wireless communications using any suitable radio frequencies and radio protocols, including cellular protocols and WiFi protocols, as two non-limiting examples.

Execution of the secure boot software 24B by the at least one data processor 22 can result in execution of procedures and algorithms in compliance with, as a non-limiting example, the TCG Mobile Trusted Module Specification, Specification Version 1.0 and later versions, such as Version 2, as enhanced by the use of the exemplary embodiments of this invention. The OS 24A can be any suitable type of operating system such as one based on, as non-limiting examples, Symbian® or Windows®. As was noted, in a mobile device embodiment the device 20 can be a cellular phone or a smartphone, or any type of portable device having wireless communication capabilities.

As should be appreciated the use of the exemplary embodiments of this invention provides a number of advantages and technical effects. For example, the use of the exemplary embodiments enables MTM2 to be, in terms of a command set, a true subset of TPM2. This is advantageous since this is one stated target of the specification activity. Further the MTM2 can be realized (as a driver) with computing devices such as PCs and laptops equipped with TPM2 to essentially define a secure booting architecture not only for mobile devices, but for PCs (non-mobile) as well. In addition, this mechanism can be included in the MTM2 specification as a default mechanism for implementing the secure boot. Note that it is not clear whether alternative mechanisms (without adding to the existent TPM2 commands) are feasible to implement.

Figure 4:
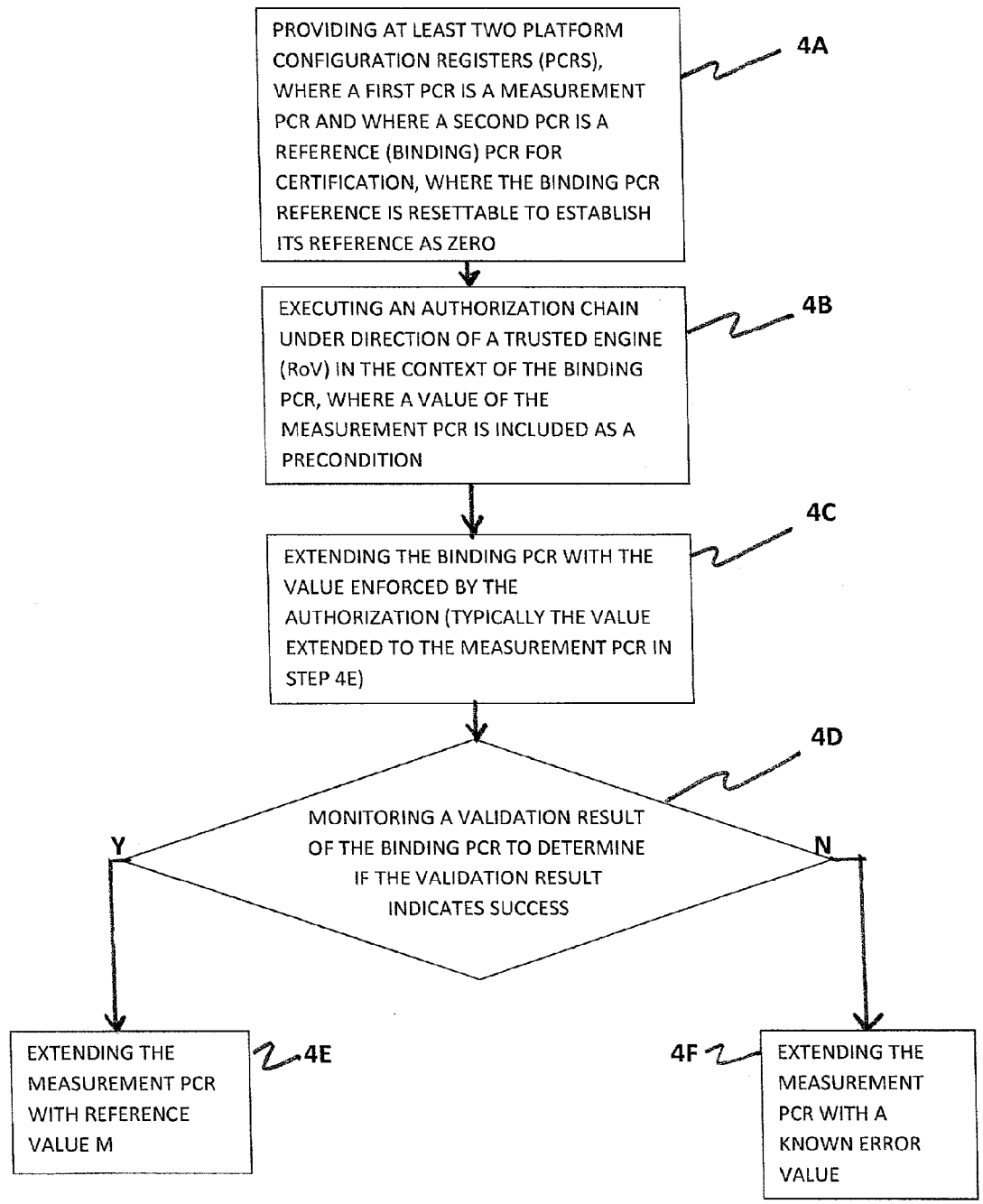
FIG. 4 is a logic flow diagram that illustrates the operation of a method, and a result of execution of computer program instructions, in accordance with the exemplary embodiments of this invention to provide a secure boot path for a device.

FIG. 4 is a logic flow diagram that illustrates the operation of a method, and a result of execution of computer program instructions, in accordance with the exemplary embodiments of this invention. In accordance with these exemplary embodiments a method provides a secure boot path for a device. In Block 4A there is a step of providing at least two platform configuration registers (PCRs), where a first PCR is a measurement PCR and where a second PCR is a reference (binding) PCR for certification, where the binding PCR reference is resettable to establish its reference as zero. At Block 4B there is a step of executing an authorization chain under direction of a trusted engine (RoV) in the context of the binding PCR, where a value of the measurement PCR is included as a precondition. At Block 4C there is a step of extending the binding PCR with the value enforced by the authorization. In a typical case this is the same value that will be extended into the measurement PCR in Block 4E. The result of the operation of the step of Block 4C is the input to the decision Block 4D where there is performed, when the execution of the authorization chain is completed, a step of monitoring (such as with an external trusted operating system) a validation result of the binding PCR. If the validation result indicates success (Y) then at Block 4E there is a step of extending the measurement PCR with a reference value M. If the validation result instead indicates a failure (N) then at Block 4F there is a step of extending the measurement PCR with a known error value.

The various blocks shown in FIG. 4 may be viewed as method steps, and/or as operations that result from operation of computer program code, and/or as a plurality of coupled logic circuit elements constructed to carry out the associated function(s).

As such, the exemplary embodiments also encompass a non-transitory computer-readable medium that contains software program instructions, where execution of the software program instructions by at least one data processor results in performance of operations that comprise execution of the method of FIG. 4.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, the exemplary embodiments also encompass an apparatus that comprises at least one processor and at least one memory that includes computer program code. The memory and computer program code are configured to, with the processor, cause the apparatus to provide at least two platform configuration registers (PCRs), where a first PCR is a measurement PCR and where a second PCR is a reference (binding) PCR for certification, where the binding PCR reference is resettable to establish its reference as zero. The memory and computer program code are further configured to, with the processor, cause the apparatus to execute an authorization chain under direction of a trusted engine (RoV) in the context of the binding PCR, where a value of the measurement PCR is included as a precondition, and when execution of the authorization chain is completed, to monitor (such as with an external trusted operating system) a validation result of the binding PCR. The memory and computer program code are further configured to, with the processor, cause the apparatus, if the validation result indicates success, to extend the measurement PCR with a reference value M, else if the validation result instead indicates a failure to extend the measurement PCR with a NULL value.

The apparatus can be embodied as a mobile or a non-mobile device.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

As but one example, authorization of the measurement platform configuration register (Measurement PCR 14) update may be configured to be subject to a successful authorization of the binding platform configuration register (Binding PCR 16), where enforcement is implemented as part of the trusted module or engine (e.g., as part of the RoV 10).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and elements (e.g., M, Measurement PCR, Binding PCR, etc.) are not intended to be limiting in any respect, as these parameters and elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method executed at least in part by a data processor, comprising:
    providing at least two platform configuration registers, where a first platform configuration register is a measurement platform configuration register and where a second platform configuration register is a resettable binding configuration platform configuration register;
    executing an authorization chain under direction of a trusted engine to perform an authorization, where a value of the measurement platform configuration register is included as a precondition;
    extending the binding platform configuration register with a value enforced by the authorization; and
    monitoring a validation result of the binding platform configuration register.

2. The method as in claim 1, where if a validation result of the binding platform configuration register indicates success then further comprising extending the measurement platform configuration register with a reference value, while if the validation result instead indicates a failure then further comprising extending the measurement platform configuration register with a predetermined error value.

3. The method as in claim 1, where monitoring the validation result comprises the use of a trusted operating system.

4. The method as in claim 1, executed at least in part by a root-of-trust for verification, where the binding platform configuration register contains a result of an application of a policy authorization using a key, and where the root-of-trust for verification resets the binding platform configuration register.

5. The method as in claim 4, further comprising authorizing an update of the binding platform configuration register, and applying the result of that authorization as a policy for the measurement platform configuration register update to bind to an original value of the measurement platform configuration register.

6. The method as in claim 4, where the root-of-trust for verification operates to apply a policy hash function to bind command and parameter values as an eventual update of the binding platform configuration register.

7. The method as in claim 4, where the root-of-trust for verification checks a current value of the measurement platform configuration register to verify a value M to be updated to ascertain that a correct key has been used for the authorization.

8. The method as in claim 7, further comprising the root-of-trust for verification updating the binding platform configuration register with the value M.

9. The method as in claim 8, further comprising the root-of-trust for verification one of updating the measurement platform configuration register with the value M, unless if an update of the binding platform configuration register fails, then updating the measurement platform configuration register with the predetermined error value.

10. The method as in claim 1, where authorization of the measurement platform configuration register update is configured to be subject to successful authorization of the binding platform configuration register, where enforcement is implemented as part of the trusted engine.

11. A non-transitory computer-readable medium that contains software program instructions, where execution of the software program instructions by at least one data processor results in performance of operations that comprise execution of the method of claim 1.

12. An apparatus, comprising:
at least one processor and at least one memory that includes computer program code, where the at least one memory and computer program code are configured, with the at least one processor, to cause the apparatus to provide at least two platform configuration registers, where a first platform configuration register is a measurement platform configuration register and where a second platform configuration register is a resettable binding configuration platform configuration register; to execute an authorization chain under direction of a trusted engine to perform an authorization, where a value of the measurement platform configuration register is included as a precondition; to extend the binding platform configuration register with a value enforced by the authorization; and to monitor a validation result of the binding platform configuration register.

13. The apparatus of claim 12, where the at least one memory and computer program code are further configured, with the at least one processor, if a validation result of the binding platform configuration register indicates success, to extend the measurement platform configuration register with a reference value, while if the validation result instead indicates a failure to extend the measurement platform configuration register with a predetermined error value.

14. The apparatus as in claim 12, where monitoring the validation result comprises the use of a trusted operating system.

15. The apparatus as in claim 12, where the at least one memory and computer program code are further configured, with the at least one processor, to implement a root-of-trust for verification, where the binding platform configuration register contains a result of an application of a policy authorization using a key, and where the root-of-trust for verification resets the binding platform configuration register.

16. The apparatus of claim 15, where the at least one memory and computer program code are further configured, with the at least one processor, to authorize an update of the binding platform configuration register and to apply a policy for the measurement platform configuration register update to bind to an original value of the measurement platform configuration register.

17. The apparatus as in claim 15, where the at least one memory and computer program code are further configured, with the at least one processor, to operate the root-of-trust for verification to apply a policy hash function to bind command and parameter values as an eventual update of the binding platform configuration register.

18. The apparatus as in claim 15, where the at least one memory and computer program code are further configured, with the at least one processor, to operate the root-of-trust for verification to check a current value of the measurement platform configuration register to verify a value M to be updated in order to ascertain that a correct key has been used for the authorization.

19. The apparatus of claim 18, where the at least one memory and computer program code are further configured, with the at least one processor, to operate the root-of-trust for verification to update the binding platform configuration register with the value M.

20. The apparatus of claim 19, where the at least one memory and computer program code are further configured, with the at least one processor, to further operate the root-of-trust for verification to one of update the measurement platform configuration register with the value M, unless if an update of the binding platform configuration register fails then instead to update the measurement platform configuration register with the predetermined error value.

21. The apparatus as in claim 12, where authorization of the measurement platform configuration register update is configured to be subject to successful authorization of the binding platform configuration register, where enforcement is implemented as part of the trusted engine.

22. The apparatus as in claim 12, comprising a part of a wireless communication device.

23. A non-transitory computer-readable medium that contains software program instructions, where execution of the software program instructions by at least one data processor embodied in a device results in performance of operations that comprise:
in the device that also comprises at least two platform configuration registers, where a first platform configuration register is a measurement platform configuration register and where a second platform configuration register is a resettable binding configuration platform configuration register, executing an authorization chain under direction of a trusted engine to perform an authorization, where a value of the measurement platform configuration register is included as a precondition;
extending the binding platform configuration register with a value enforced by the authorization; and
monitoring a validation result of the binding platform configuration register, where if the validation result of the binding platform configuration register indicates success then performing an operation of extending the measurement platform configuration register with a reference value, while if the validation result of the binding platform configuration register instead indicates a failure, then performing an operation of extending the measurement platform configuration register with a predetermined error value.

* * * * *